May 16, 1933.  A. C. BOWERS ET AL  1,908,950
STRIPPING APPARATUS
Filed Sept. 28, 1932   4 Sheets-Sheet 1
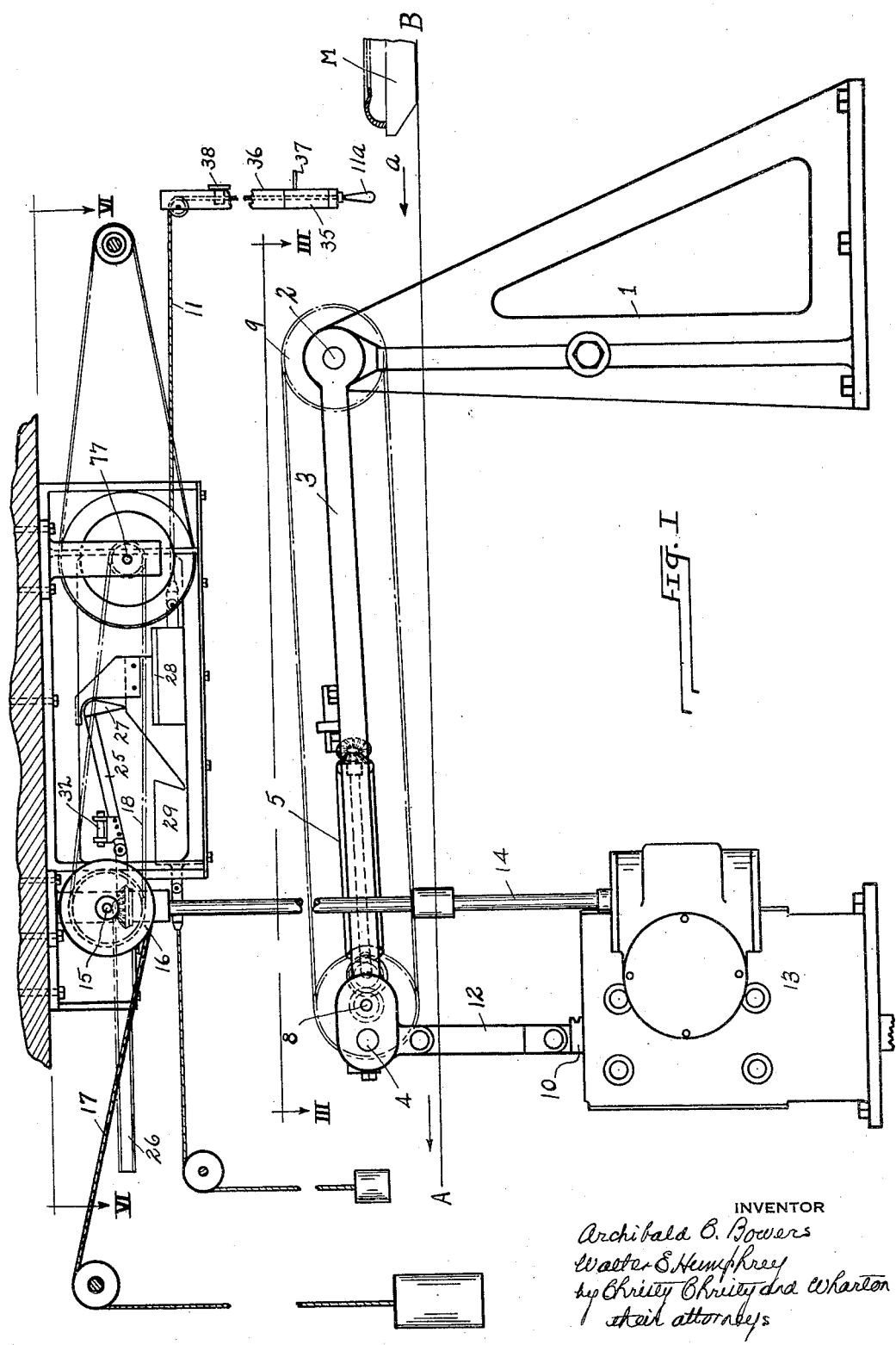
FIG. I
INVENTOR
Archibald C. Bowers
Walter E. Humphrey
by Christy Christy and Wharton
their attorneys

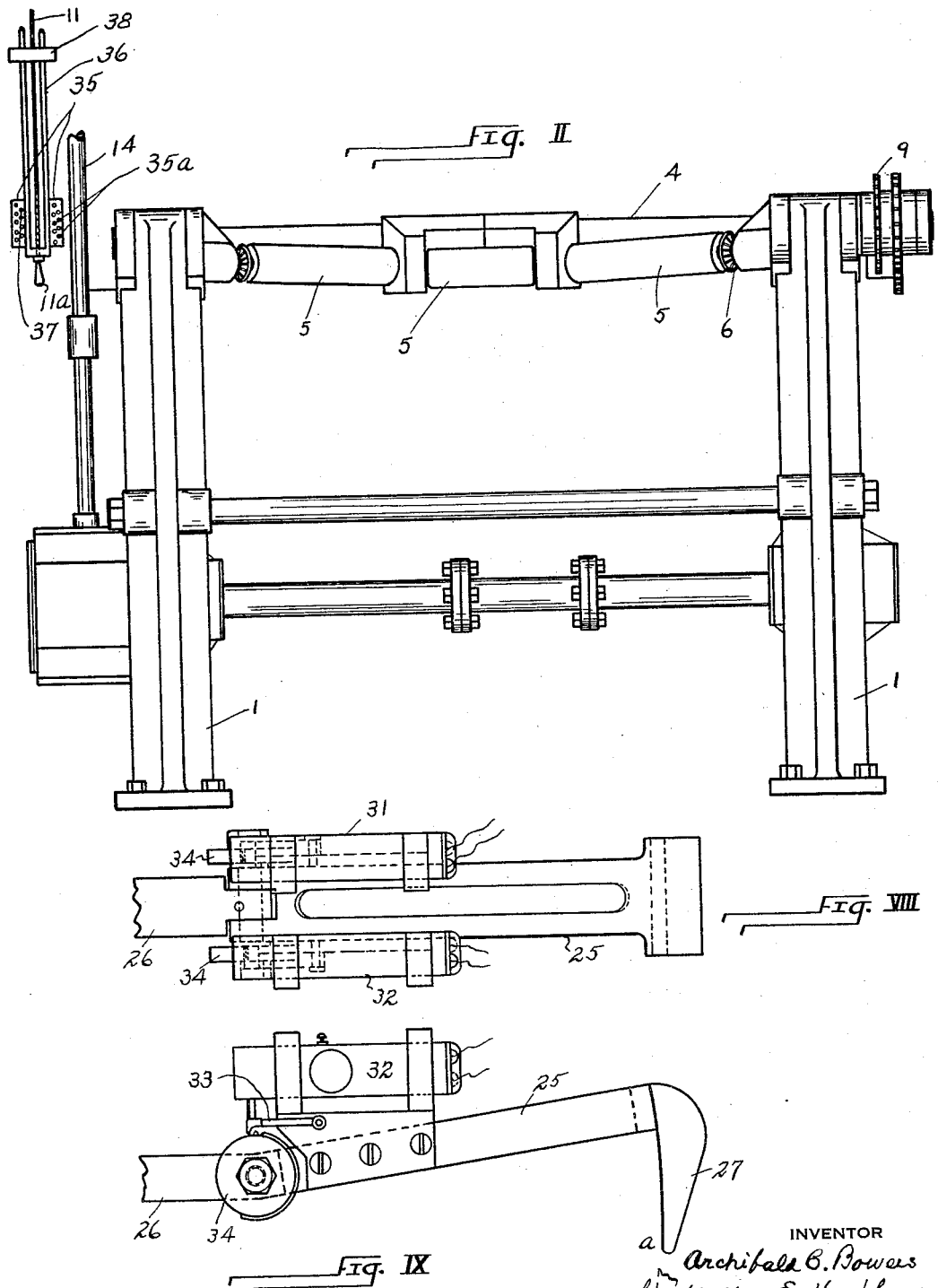

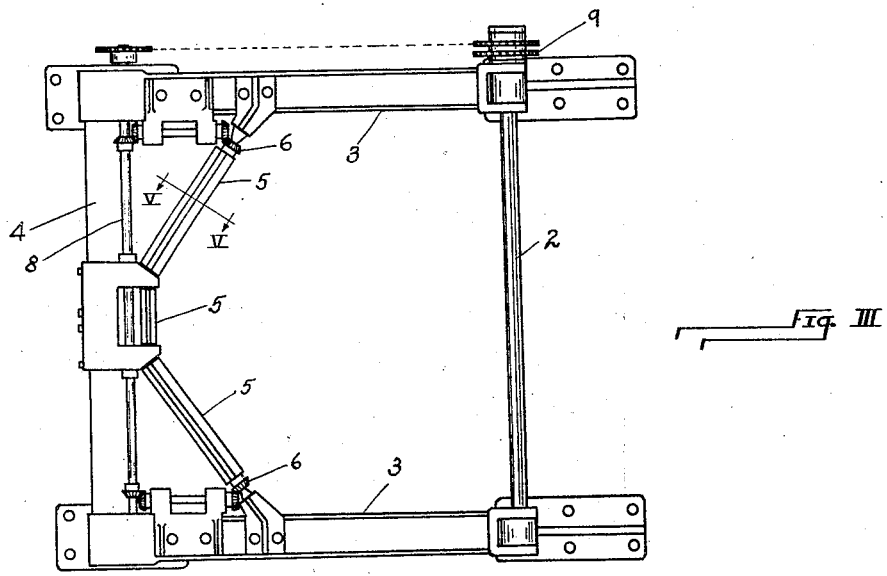
Fig. III
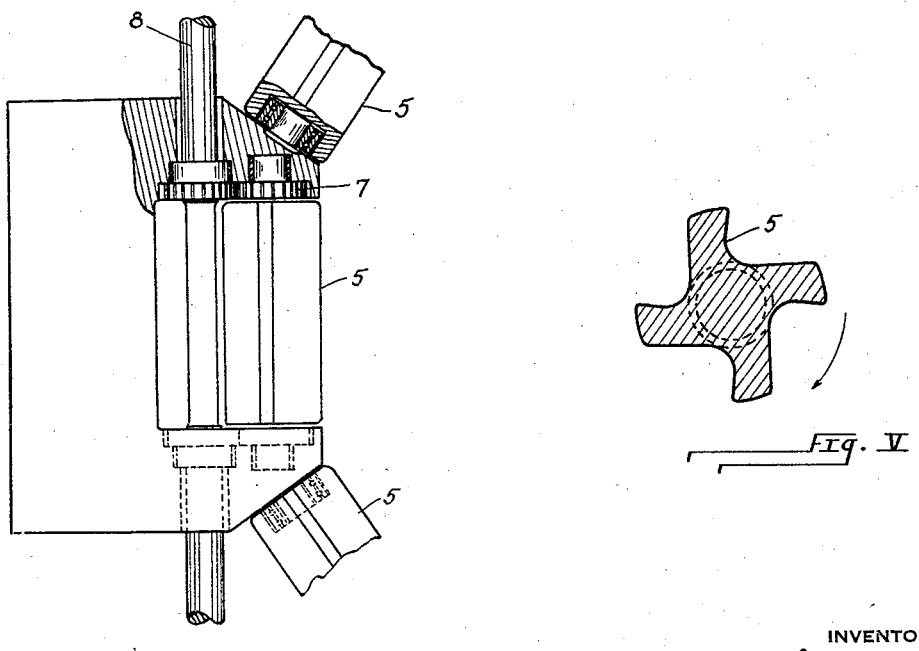
Fig. IV
Fig. V
INVENTOR
Archibald C. Bowers
Walter E. Humphrey
by Christy Christy and Wharton
their attorneys May 16, 1933.  A. C. BOWERS ET AL  1,908,950
STRIPPING APPARATUS
Filed Sept. 28, 1932   4 Sheets-Sheet 4
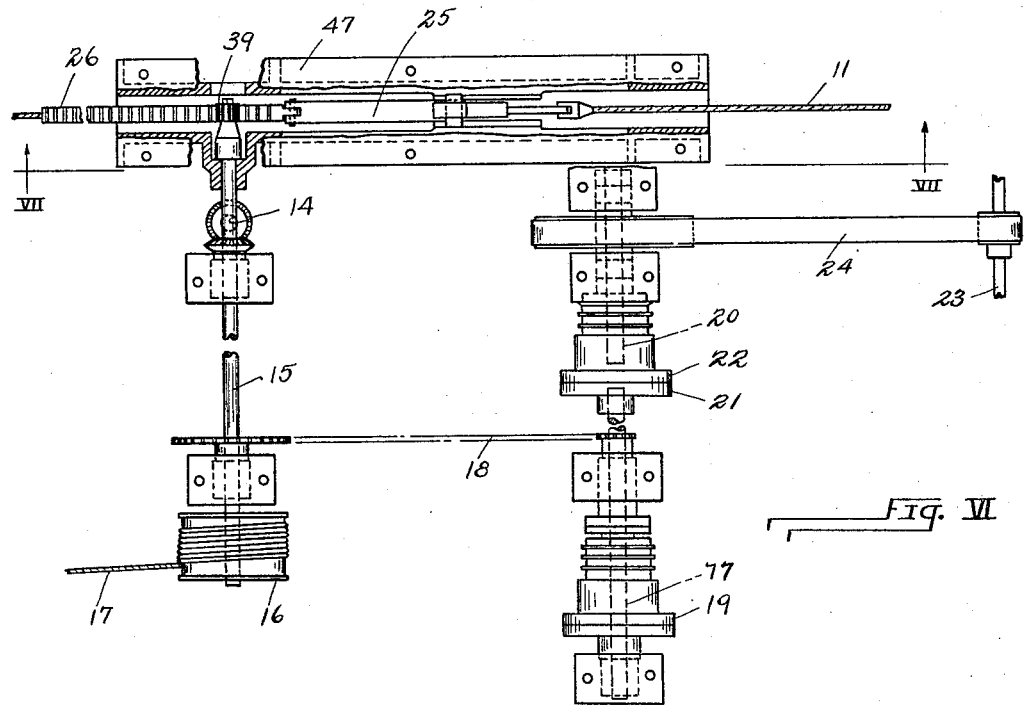
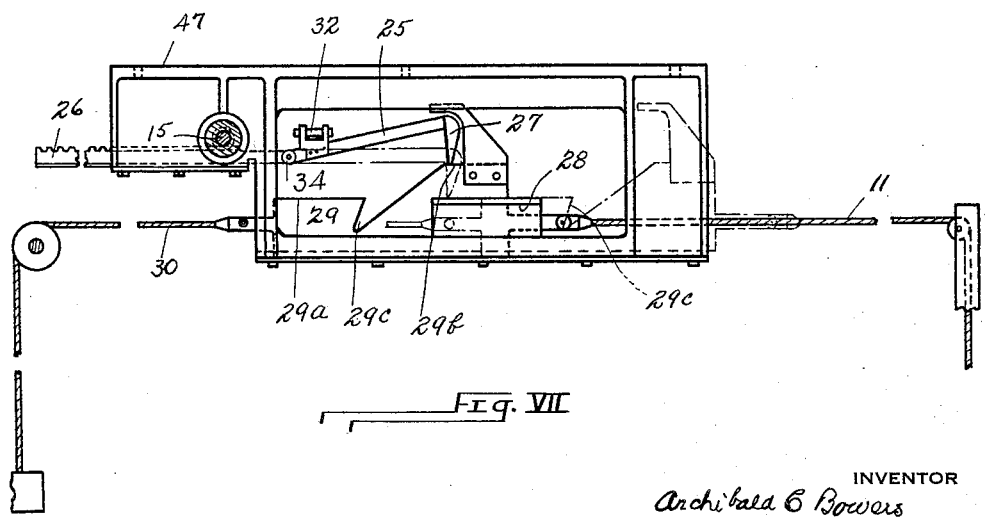
INVENTOR
Archibald C Bowers
Walter E. Humphrey
by Christy Christy and Wharton
their attorneys

UNITED STATES PATENT OFFICE

ARCHIBALD C. BOWERS, OF GREENSBURG, AND WALTER E. HUMPHREY, OF JEANNETTE, PENNSYLVANIA, ASSIGNORS TO PENNSYLVANIA RUBBER COMPANY, A CORPORATION OF PENNSYLVANIA

STRIPPING APPARATUS

Application filed September 28, 1932. Serial No. 635,218.

This invention relates to the removal of flexible and resilient articles from relatively rigid containers; it finds practical application in the removal of the shoes of pneumatic tires from the molds in which they have been minutely shaped and vulcanized, and in such application it will be shown and described.

Fig. I is a view in side elevation of tire-stripping apparatus in which the invention is embodied; Fig. II is a view in end elevation of a portion of the apparatus shown in Fig. I (from the showing of Fig. II a certain spacer bar is, for clarity of illustration, omitted); Fig. III is a view in horizontal section, on the plane indicated at III—III, Fig. I; Fig. IV is a fragmentary view, partly in plan, partly in horizontal section, and to larger scale of a detail; Fig. V is a view in cross-section of one of the elements of the apparatus, the plane of section being indicated at V—V, Fig. III; Fig. VI is a fragmentary view in plan from above, on the plane VI—VI of Fig. I; Fig. VII is a fragmentary view, on the plane VII—VII of Fig. VI; and Figs. VIII and IX are fragmentary views, showing respectively in plan from above and in side elevation an electrical control mechanism.

Tire molds of pot-head type consist essentially of halves which meet in a plane coincident with the mid-plane of the tire. In preparation for use the two-mold halves of each pair are unequally coated over their inner, tire-engaging surfaces with soapstone, to the end that, when the mold is opened, one half will come freely away, leaving the tire adhering, in its place within the companion mold-half. From this second mold-half, in which it remains adhering, the finished tire must be freed. In ordinary factory practice a conveyor is provided, extending from a point adjacent the vulcanizer to a more remote and convenient place, and upon this conveyor successive mold-halves, each bearing an adherent tire, are set and by it they are carried. The so filled mold-halves rest on the conveyor in horizontal position with the freed half of the tire exposed on the upper side. It has long been the practice to strip the tire from the second mold-half manually, with the aid of prizing instruments. More recently, apparatus has been devised for effecting this stripping, and the present invention is found in improvements in such apparatus.

Referring to Fig. I of the accompanying drawings, a line A—B indicates the plane of the upper surface of such conveyor as is alluded to above, and an arrow $a$ indicates the direction of conveyor travel. It will be understood that the successively advancing tire-laden mold-halves M advance in the direction indicated, and in a position determined by the fact that they rest upon the conveyor surface disposed in this plane.

Adjacent to and on opposite sides of the conveyor a pair of standards 1 are set (cf. Fig. II), and in these standards a stirrup-shaped frame is pivoted; while between the standards and at proper interval above the plane of the conveyor a spacer bar 2 extends.

The stirrup-shaped frame includes the arms 3 (at whose otherwise free ends pivoting is effected) and the cross-bar 4. In this frame a plurality of stripper tools 5 (in this case three in number) are rotatably mounted. The cross-sectional shape of these tools (they are in this particular identical) is sufficiently indicated in Figs. III, IV, and V. They are essentially cylindrical, but fluted or ribbed longitudinally, and the flutes or ribs are adapted to engage, with upward-prizing effect, the tread surface of an approaching tire. This action will be sufficiently understood on considering Fig. IV, noting the direction of tool rotation (indicated by an arrow), and with the further understanding that the direction of conveyor advance is from left to right. These stripper tools are mounted in the stirrup-shaped frame, with their axes disposed in the plane in which the frame itself extends, and in positions symmetrical with respect to the mid-line of the conveyor; the two end tools of the group of three are oppositely inclined with respect to such mid-line, and they extend divergently from their proximate ends, adjacent the mid-line of the conveyor, in the direction opposite that of conveyor advance. The intermediate tool of the group is transversely placed, centered on the mid-line of the conveyor, and between the proximate ends of the two companion tools. The grouping is such that an advancing tire will come to engagement with the three tools with approximate simultaneity, that all three may be effective upon it in unison. The particular positions of these tools will be understood on comparing Figs. I–IV.

Means are provided for rotating these stripping tools in uniform direction and in such direction that the faces of the ribbed tools, as the tread of the advancing tire comes to abutment upon them, are moving upwardly. Specifically, in the particular machine shown, the tools 5 are freely rotatable on bearings mounted on the stirrup-shaped frame, and they are rotated, the obliquely set tools through beveled gears 6 and the transversely set tool through spur gears 7, in response to rotating of a shaft 8 which extends transversely of the stirrup-shaped frame. The shaft 8 may be rotated by the sprocket drive indicated, from a positively driven wheel 9 mounted coaxially with the pivoted frame.

Machines have heretofore been made and used in which a single stripper tool is provided, extending transversely of the conveyor, and engaging the advancing tire initially at a single point of tangency. It is characteristic of the machine of my invention that its plurality of stripper tools engage the tire simultaneously at a plurality of points of initial tangency. In consequence, as the conveyor-borne and tire-bearing mold continues to advance, convergent compressive stresses as well as upward stresses are exerted upon the body of rubber situated between the two points of engagement; and in response to such compressive stresses the elasticity of the rubber itself becomes a major factor in breaking adhesion between the tire and the mold wall. The instrument becomes, by virtue of this new factor, more certainly effective. Furthermore, in consequence of the provision of a plurality of simultaneously effective tools, the tire is broken away and released from the mold at an earlier stage in its progress; distortion of the tire is distributed, not concentrated, and the distortion is less, and the liability is diminished of injuring the air-bag within the tire, or of kinking the wire-containing bead, which is a characteristic of tires of the prevalent type. The intermediate tool has the further advantageous effect of limiting the extent of the elongation caused by engagement of the advancing tire upon the two laterally disposed tools and of co-operating with them to effect release.

The bar 2 conveniently lies in the axis of pivoting of the stirrup-shaped frame. It is a spacer, situated at a suitable interval above the conveyor surface, and is adapted to prevent the further advance of a tire-bearing mold which by chance has not properly been placed, prone upon the conveyor surface.

The stirrup-shaped frame is mounted pivotally in the standards 1, not merely that it may on occasion be swung upwardly, to leave freer access to the conveyor and to articles resting thereon: it is pivotally mounted, to the end that it may be adjusted to one and another service position, to effect the stripping of tires of different sizes from molds of correspondingly different sizes. My invention, then, further includes means for shifting the pivoted frame, and an automatic control, whereby the frame may be shifted to one and another particular position.

We provide a rod 10 mounted to move vertically in suitable bearings, and means for shifting the rod vertically, in response to the travel of a cable 11. The rod 10 is provided along one edge with gear teeth which mesh, within gear box 13, with gearing driven by rotation of a vertical shaft 14. The vertical shaft 14 is geared positively to a countershaft 15, and counter-clockwise rotation of countershaft 15 (Fig. I) is effective to produce (by means of the vertical shaft 14 and gearing in box 13) downward movement of rod 10; while clockwise rotation of the countershaft 15 effects upward movement of the rod. Electrically-controlled means are provided for positively rotating the countershaft 15 counter-clockwise, and a counterweighted cable 17 trained over a drum 16 on shaft 15 is, under the control of the attendant, adapted to produce clockwise rotation of the countershaft 15 and the consequent rise of rod 10. The stirrup-shaped frame which carries the tools 5 is connected by link connection 12 with the rod 10, to the end that rod 10 in its controlled position shall determine the interval at which the tools 5 stand spaced above the plane of the conveyor.

It will be understood that, as mold sections advance, the stirrup-shaped frame will be swung downward from its elevated position of rest, so that the tools 5 will come to the position (Fig. I) for stripping the tires from the mold sections. As mentioned above, the interval at which the tools 5 stand above the conveyor is adjusted, to afford accommodation to articles of various sizes. We obtain such adjustment by controlling the range of rotation of shafts 14, 15. Manifestly, as the range of such rotation is great or less, the interval through which the frame 3 swings from its elevated position of rest will be great or less, and the space interval between tools 5 and the conveyor will be precisely determined. Means are provided, responsive to the travel of cable 11, for causing shaft 15 to rotate in counter-clockwise direction through a range which is great or less, according to the range of travel of cable 11.

The countershaft 15 is in rotation-imparting connection with a shaft 77, say by means of chain belting 18 (Fig. VI), and this shaft 77 is organized with a magnetic brake 19, which is adapted to secure the shaft against rotation when the brake is electrically energized. Axially aligned with shaft 77 is a companion shaft 20. One element 21 of a magnetic clutch is secured to the shaft 77 and the companion element 22 of the clutch is secured to the shaft 20, so that the energizing of the clutch will unite the two shafts 77, 20. Shaft 20 is continuously driven by a motor or other source af motion. In this case we show a line shaft 23 (Fig. VI) and belt 24 as means for rotating shaft 20. Thus, the electrical energizing of clutch 21, 22 unites intermittently shaft 77 with the constantly rotating shaft 20, and rotation (counter-clockwise) is intermittently imparted to countershaft 15, for the actuation of the stirrup-shaped frame 3. When the rotation of shaft 15 has progressed to the predetermined point, with tools 5 at the proper interval above the conveyor, the clutch 21, 22 is automatically de-energized, and the brake 19 is simultaneously energized, to hold the frame in its adjusted position, while the tools 5 operate in removing the tire from the mold section advancing beneath them upon the conveyor. The operation of the clutch and of the brake is automatic, once the attendant has pulled the control cable 11; and, as indicated above, the distance through which the cable 11 is pulled determines the interval at which the tools 5, when brought to rest, are spaced above the conveyor.

The means for automatically controlling the operation of the apparatus, in response to the pulling of cable 11, comprise an arm 25, pivotally attached to the end of a toothed rack 26 mounted for travel in a frame 47 (cf. Figs. VI and VII). The structure of the arm 25 is illustrated in detail in Figs. VIII and IX, and it will be observed that the arm includes at its distal end a downward extending finger 27. The finger 27 is successively supported in the three positions $a$, $b$, $c$, indicated in Fig. IX; the means for swinging the arm between such positions and for supporting it in such positions include a stationary rest 28 and a slide 29, to which slide the cable 11 is secured (cf. Fig. VII). The slide 29 is movable between alternate positions in the frame 47; the top edge of the slide includes two shelf portions 29$a$ and 29$b$, and between the shelf portions a recess or notch 29$c$ is provided. A counterweighted cable 30 serves to detain the slide 29 in its normal position—the full line position shown in Fig. VII. Upon pulling the handle 11$a$ (Figs. I—II) of the control cable downward, the slide 29 is moved to the dotted position (Fig. VII)—the position in which the operation of the apparatus automatically progresses.

Referring again to Figs. VIII and IX, the arm 25 carries two electrical switches 31 and 32; switch 31 controls the supply of electrical energy for the clutch 21, 22 and switch 32 controls the electric energy for operating magnetic brake 19. The particular structure of the switches 31, 32 is a matter for the engineer. Suffice it to say that they may be of vacuum-tube type, and each includes a pivotally mounted switch-operating arm (33). Rigidly secured to the rack 26, and coaxial with the axis of pivoting of the arm 25, is a pair of cam disks 34, each disk of the pair being associated with one of the switches 31, 32, and the switch-operating arms 33 ride upon the peripheries of the disks. The shape of the cams is such that in position $a$ of the arm 25 both switches 31, 32 are open; in position $b$ of the arm switch 31 alone is closed and the magnetic clutch 21, 22 is energized, producing the above-described consequent operation of the apparatus; and in position $c$ of the arm switch 32 alone is closed, energizing the magnetic brake 19.

Figs. I and II show the pair of gauge blocks 35 which are associated with the control cable 11, the blocks 35 being immovably supported by stationary frame members 36. The blocks 35 have a plurality of orifices 35$a$ formed in them, and in this case the orifices are vertically spaced from one another in one-eighth-inch center-to-center intervals. Each orifice is correlated with and conveniently marked to indicate one of the various sizes of mold sections which may advance along the conveyor. A pin 37 is by an attendant set in one or another of the orifices 35$a$, according to the size of the particular mold section approaching on the conveyor, and a stop 38 is secured to the control cable 11, so that when the attendant pulls the control cable downward, the range of travel of cable 11 is accurately limited. That is to say, the cable is pulled downward, until it stop 38 abuts upon the pin 37. By placing the pin 37 in the appropriate orifice of blocks 35, the means which respond to cable travel, to swing the stirrup-shaped frame 3 downward, respond in exact accordance with the distance through which the cable travels—the greater the travel of cable 11 the lower the swing of frame 3.

To further an understanding of the invention, we shall describe the cycle of one mold-stripping operation. The attendant stands beside the conveyor and adjacent the gauge block 35. Each tire-mold section conveniently bears in such manner as to be read at a glance by the attendant an indication of its size,—as, for example, the numeral X. When the attendant notes the number upon the approaching mold section, he places the pin 37 in the correspondingly denoted orifice in the gauge blocks; and then pulls the control cable downward, until the stop 38 bears upon the pin. Thus, the gravity-restrained slide 29 is shifted from the full-line position to the dotted-line position shown in Fig. VII. This range in the shift of slide 29 will be great or less, according to the setting of pin 37. The finger 27 of arm 25, which initially had been supported in position $a$ upon shelf portion 29$b$ of the slide, falls and rests upon the stationary part 28, in its intermediate position $b$, Fig. IX. When arm 25 falls into position $b$, the switch 31 is closed, as above explained in detail, energizing the magnetic clutch 21, 22. Immediately, rotation is imparted to countershaft 15, and thence rotation is transmitted to shaft 14. Accordingly, the rod 10 moves downward, effecting the downward swing of the stirrup-shaped frame 3.

Turning to Fig. VI of the drawings, it will be observed that we provide a pinion 39 which is secured to the countershaft 15 and is in mesh with the rack 26. When, therefore, the slide 29 is shifted to the right, Fig. VII, and the shaft 15 is rotated counterclockwise, the rack 26 is moved to the right, carrying with it the arm 25. The finger 27 of the arm 25 then slides over the entire face of stationary rest 28, and upon leaving the rest 28 slides upon the shelf portion 29$a$ of the slide 29, which shelf portion 29$a$ has, in the shifting of the control cable 11, been brought to such position that the notch 29$c$ lies to the right of the rest 28. The distance through which the rack 26 must advance before the finger 27 reaches the notch 29$c$ is dependent upon the range through which the slide 29 has initially been shifted; it is dependent, that is to say, on the setting of the pin 37. When in the left-to-right movement of the rack 26 the supporting finger 27 reaches and falls into notch 29$c$ as, of course, it does, the switch 31 is opened and the switch 32 is immediately closed. Thereupon, the elements 21, 22 of the clutch disengage, and the magnetic brake 19 closes, simultaneously locking the shaft 15, the frame 3, and the other driven parts in the positions to which they have at the instant been brought.

Thus the frame 3 is lowered to a particular position above the conveyor, a position predetermined in accordance with the size of the tire-mold section advancing upon the conveyor. In such position of the frame 3, the tools 5 are properly situated to strip from the particular mold as it advances the tire which it carries. Release of the control cable 11 permits the counter-weighted cable 30 to effect the return of the slide 29 to its initial position, and, during the return movement of the slide, the arm 25 in bearing against the inclined side of notch 29$c$ is elevated once more to a position of rest upon the shelf portion 29$b$. So, the two switches 31, 32 are opened, the clutch and brake are released, and the parts are subject to the effect of the drum and counterweighted cable 16, 17. The counterweighted cable effects a clockwise rotation of the drum and the countershaft 15; the rack 26 and arm 25 are restored to their normal positions, and the stirrup-shaped frame 3 is swung upward in response to the consequent rotation of shaft 14.

It will be perceived in Fig. VII that, as the travel of cable 11 is greater or less, the interval at which the notch 29$c$ lies to the right of the stationary rest 28 will be greater or less. Accordingly, the range of rotation of the countershaft 15 required to shift the rack 26 to such position that the arm 25 falls into its third position ($c$) will be great or less, i. e., will depend upon the travel of the control cable 11. The positioning of the pin 37 in one or another of the gauge-block orifices 35$a$ defines or predetermines the permissible travel of the cable, and the distance of such travel in turn determines the range of counter-clockwise rotation of the shaft 15. Manifestly, the nterval between the tools 5 and the conveyor is subjected to exact regulation.

In operation the movement of conveyor and stripping tools co-operate to flex the body of the tire, and progressively to break it free of adhesion to the mold, and this without injury. The loosened tire passes over the frame, while the mold-half passes beneath; the tire passing over the frame rests again on the mold-half, and the mold-half continues to advance on the conveyor, bearing the tire, now dislodged from adhesion to it. It remains then a simple matter to remove separately the tire and the mold-half and carry them, each to its appropriate place.

We claim as our invention:

1. Apparatus for stripping from a relatively rigid matrix a flexible and elastic body which includes a travelling conveyor adapted to sustain and carry the matrix with the supported body in place within it, and a plurality of positively driven rotary tools adapted to engage the matrix-borne body at a plurality of spaced-apart points and to exert simultaneously upon such body convergent stresses in directions away from the matrix.

2. Apparatus for stripping from a relatively rigid matrix an annular body of flexible and elastic material which includes a conveyor adapted to advance in substantially horizontal plane bearing the body-containing matrix, three rotary stripping tools arranged above the conveyor and extending, one of them at right angles to the direction of conveyor advance, and the other two obliquely to the direction of conveyor advance and adapted simultaneously to engage a matrix-borne body as it advances upon the conveyor, and means for rotating the said tools in directions which at the points of engagement with the said body are upward.

3. Apparatus for stripping a rubber tire from a mold-half including a conveyor adapted to advance in substantially horizontal plane having a tire-containing mold-half resting upon it, a plurality of tire-stripping tools rotary upon angularly disposed axes arranged above the said conveyor and adapted simultaneously to engage at spaced-apart points of tangency a tire within a mold-half advancing on said conveyor, and means for rotating the said tools in directions which at the points of such tangency are upward.

4. Apparatus for stripping a rubber tire from a mold-half including a conveyor adapted to advance in substantially horizontal plane having a tire-containing mold-half resting upon it, a stirrup-shaped frame pivoted at opposite sides of the conveyor, and extending from such pivot points in the direction in which the conveyor advances, a plurality of stripper tools rotatably mounted in the frame on axes angularly disposed one to the other, and diverging one from the other in the direction opposite to that of conveyor advance, means for rotating said stripper tools, and means for shifting said frame from one to another particular position in the range of its pivotal movement.

5. Apparatus for stripping a rubber tire from a mold-half including a conveyor adapted to advance in substantially horizontal plane having a tire-containing mold-half resting upon it, a stripping tool adjustable in position arranged above the conveyor, a control member movable to one or another of a plurality of particular positions, and automatic means operative in sequence upon the movement of the control member for bringing the stripping tool to a corresponding position in its range of adjustability.

In testimony whereof we have hereunto set our hands.

ARCHIBALD C. BOWERS.
WALTER E. HUMPHREY.